United States Patent [19]
Sarno et al.

[11] 3,885,502
[45] May 27, 1975

[54] ENTERTAINMENT VEHICLE RIDE

[75] Inventors: Jay Sarno; Jon Daugherty, both of Las Vegas, Nev.; Carl Schneidinger, Rolling Hills Estates, Calif.

[73] Assignee: Sarno International Speedways, Inc., Las Vegas, Nev.

[22] Filed: May 9, 1974

[21] Appl. No.: 468,430

[52] U.S. Cl. ............ 104/53; 46/243 LV; 238/10 F; 273/86; 404/6
[51] Int. Cl. ........................................... A63h 18/12
[58] Field of Search .......... 238/10 R, 10 E, 10 F, 3; 104/53, 60, 147, 148; 46/243 LV, 201, 243; 273/86; 404/6, 7

[56] References Cited
UNITED STATES PATENTS

| | | | |
|---|---|---|---|
| 2,717,557 | 9/1955 | Seyffer | 104/60 |
| 3,218,991 | 11/1965 | Wehner | 238/10 R |
| 3,373,524 | 3/1968 | Nirenberg | 104/60 |
| 3,729,133 | 4/1973 | Covert | 238/10 E |
| 3,810,706 | 5/1974 | Grimm et al. | 238/10 R |

*Primary Examiner*—M. Henson Wood, Jr.
*Assistant Examiner*—Richard A. Bertsch
*Attorney, Agent, or Firm*—Herbert C. Schulze

[57] ABSTRACT

This is an entertainment ride, in which electrically operated miniature automobiles are utilized, and in which the ride is characterized by features providing maximum thrills, with full safety by use of a unique combination of: An oval, banked, and elevated tract; Safety wheels; Roller guides; Special safety harnesses; and most particularly, a new and distinct metal floor properly adhered to an insulated concrete base, and from which the power is derived for operation of the automobiles by a distinctive, insulated, segmented unique design.

7 Claims, 5 Drawing Figures

PATENTED MAY 27 1975 3,885,502

SHEET 2

ENTERTAINMENT VEHICLE RIDE

BACKGROUND OF THE INVENTION

1. Field of the Invention

This invention is in the general field of electrical amusement rides, and more particularly is directed to a speedway type ride, in which an electrically operated bumper type vehicle is utilized and wherein the power is transmitted through a metal floor and without the necessity of an overhead or auxiliary power connection.

2. Description of the Prior Art

There are numerous amusement car rides and bumper car rides, the full description of which would be too cumbersome for inclusion herein. Those skilled in the art, however, are familiar with electrically operateed amusement rides both of the so called "bumper car" type as well as those in which vehicles ride upon fixed courses upon roadways and the like, whether operated by gasoline power or electrical power or the like. Some of the more familiar rids are those frequently located in carnivals and the like in which either a steel floor is utilized having alternate plates to pick up alternately positive and negative direct current by different connections beneath the car or wherein the floor may be either positive or negative, with a grid overhead contacted by a wire brush or the like to form the other connection.

In the prior art there are also gasoline operated cars such as the speedway vehicles common to certain types of amusement parks.

SUMMARY OF THE INVENTION

Amusement parks and the like are an essential part of the primary recreational activity of a large segment of the population. Among other types of activities in amusement parks, it has always been common to find "rides" of various types, such as merry-go-round rides, railway rides, automobile rides, and the like. One of the most popular types of rides has always been individually operatee vehicles, or miniature automobiles or cars. In some cases such cars take the form of racing vehicles on an appropriate track so that competition may actually take place between various participants. In another form of an extremely popular ride there are the so called "bumper cars" in which there is generally an electrical motor, in a small vehicle, with the rubber or other suitable protective device surrounding the vehicle. Such vehicles are designed to operate normally upon a flat area, and most generally will have a contact to a metallic floor or the like with an extending pole overhead to a wire grid or the like for the completion of the electrical circuit. In this type of ride, the participants enjoy "bumping" each other and this operation and form of enjoyment is well known to those in the art.

In some instances bumper car operators have attempted to participate in races, in which they may bump each other off course, and thus not only be dependent upon speed, but also upon a form of physical contact to determine the winner of a speed contest. Such attempts have always been difficult and less than fully satisfying since there is no defined course which may be followed. Likewise, it has not been possible to make such an arrangement in which various elevations may be traversed. To a large extent this has been due to the inability properly to maintain the metallic floors in place, and because of the difficulty of having varying heights of overhead poles and the like.

Another problem of importance in connection with rides of the type described is the safety feature. The operators of bumper car rides and the like must constantly be certain that there is not danger of electrocution or serious injury from the physical contact part of the ride.

There have been some attempts to secure the metal floors to a suitable permanent base, but because of insulating problems and the leakage of electricity this also has been generally unsatisfactory except wherein the metal bases are laid upon a wooden substructure.

We have studied all of the problems and have now invented and developed a completely unusual and highly practical solution to the various problems so as to provide a more entertaining and at the same time more safe ride. We have also given attention to a problem frequently ignored hither to, and that is a suitable safety belt to maintain the rider within the vehicle, particularly in the case of small children who might easily be thrown from the vehicle. Sometimes this has not been accomplished because of the difficulty of adjusting safety belts. With our unique belt arrangement, however, we have combined a safety belt and/or shoulder belt in a new and unique arrangement wherein it may be quickly applied without the necessity of adjustment.

Under conditions of turning, attempts at elevated tracks, banking thereof, and the like, a particular problem has been that of the single front wheel which is normally utilized to tip and to cause injury, discomfort or damage to the vehicle. A further problem has been the tendency of such vehicles to congregate in confined curvatures and the like, and this causes difficulty for the riders with the failure of the enjoyment together with problems for the operators because of the necessity of personnel to free such problems.

We have invented a combination of unique elements, of which perhaps the most important, is a method of providing a segmented track in which alternate metal floor pieces carry alternately different electricity (that is, positive and negative) wherein we have developed a means of bonding the metal plates to a concrete floor by use of epoxy materials which adhere to the steel and the concrete, insulate the metal from the concrete, and by appropriate spacing insulate the plates from one another. We have further anchored these plates in such manner that there is not a harmful leakage of electricity to the concrete or to alternately charged plates. Further, the cushioning effect which is achieved by the use of our insulating epoxy adhesive prevents deterioration of the concrete, prevents undue displacement of the metal plates, and provides sufficient cushioning for all necessary safety purposes.

Combined with the special track we have arranged, which is a great advance in itself, we have been able to form the track in an elevated or partially elevated and banked configuration, in which there is no jamming of the vehicles at the curvatures, wherein we have made a special design of guiding rollers along the inside and outside of such curvatures which prevent the vehicles from becoming jammed and causing a breakdown of the ride. Also, a partial feature of this is the combination of miniature safety wheel arrangements to avoid undue tipping of the vehicles which results in added safety as well as increasing the utilization of the vehicles with the rollers for continuous operation. We have also combined with this a unique shoulder harness which contributes greatly to the safety of the occupants and yet which does not require adjustment for individual sizes and the like.

As a result of our innovations, it has now been achieved, for the first time, that bumper car rides and a directional banked and elevated speedway ride of unusual quality, attraction, and safety may be utilized.

It is an object of this invention to provide a combined bumper and speedway car ride.

It is another object of this invention to provide a ride as above described in which there is a quickly applied safety harness for the occupants.

Another object of this invention is to provide a stable metal floor for the ride of this invention adhered in an insulated manner to a concrete base; Another object of this invention is to provide a ride of this character in which the cars will not jam at corners and the like.

The foregoing and other objects and advantages will be clear to those skilled in the art upon reading the Description of a Preferred Embodiment which follows in conjunction with the appended drawings.

DESCRIPTION OF A PREFERRED EMBODIMENT

Figures 1, 2:
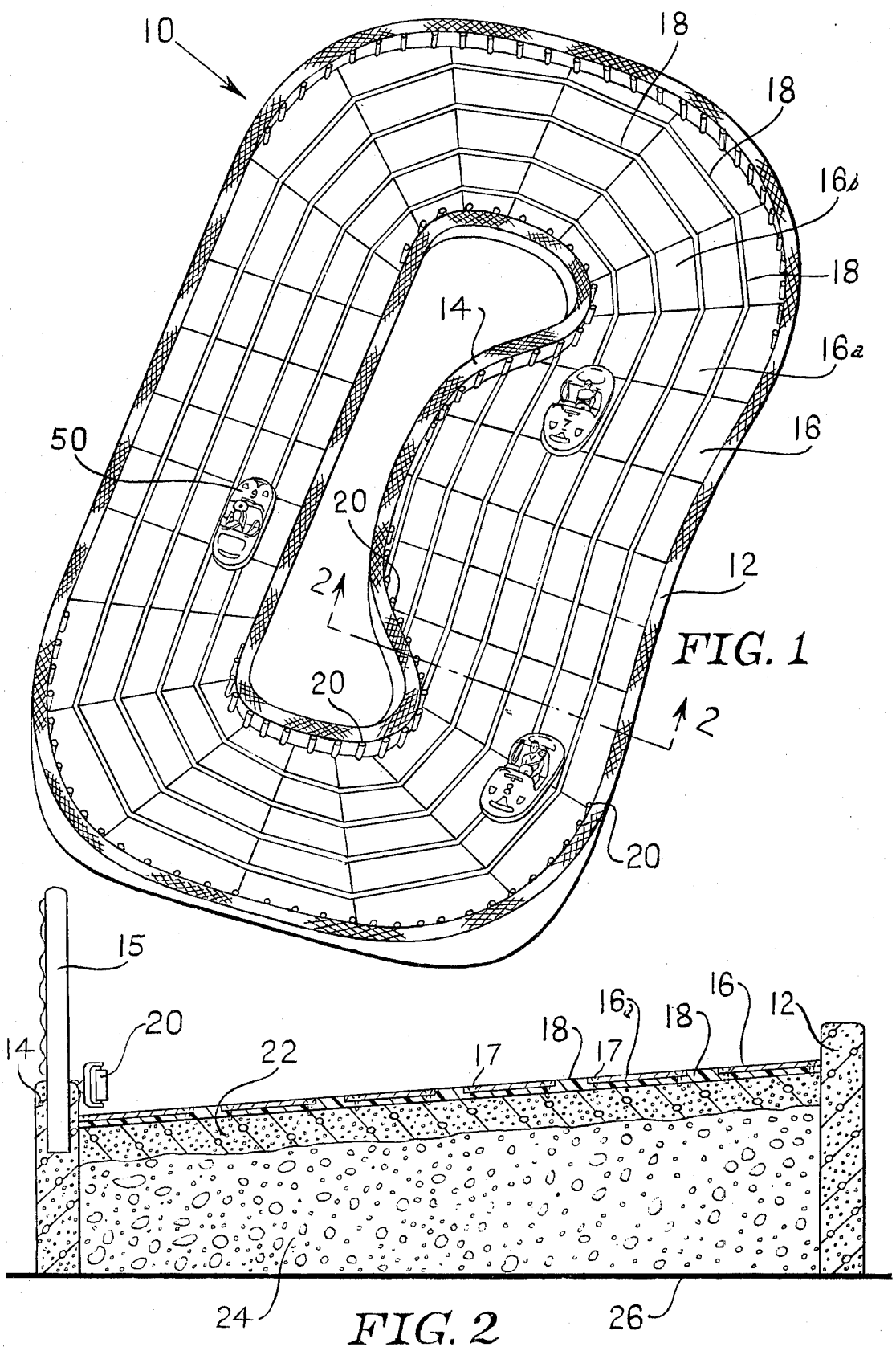
FIG. 1 is an elevational perspective of a preferred embodiment of the entertainment ride of this invention.
FIG. 2 is a section on 2—2 of FIG. 1.

The entertainment ride of this invention is depicted generally in FIGS. 1 and 2, wherein an oval track 10, having banked, and elevated areas, is shown to be comprised of a reinforced concrete structure 22 upon an appropriate base 24 such as crushed rock or the like, and confined within an inner wall 14 and an outer wall 12 defining the confines of the track. The base, and the walls are laid upon ground level 26 or upon any desired suitable sub-surface arrangement. A screen, or the like 15, may be utilized to block the view from one side of the track to the other if desired.

The vehicles 50 will ride upon the track at any given location and may race about the track and bump each other out of the normally forward course of direction or in such other manner as may be desired.

The actual surface of the track is composed of a number of metal plates such as 16, 16A, 16B and the like. The metal plates are so arranged that one series of metal plates such as the outer row 16 will be in contact with one another around the entire length of such particular segment and will be insulated from the next continuos segment of plates 16A by an insulating strip 18. Likewise 16A will in turn be insulated from the strip 16B by a like insulating strip 18.

The metal plates are fastened to, and insulated from the concrete 22 by means of a layer of bonding and insulating epoxy 18, which epoxy is allowed to extend between the plates 16 and 16A for example so as to provide the insulating layer and control 16.

When desired, it is possible to fasten the plates 16, 16A and the like to the concrete 22 by means of appropriate concrete nails or the like 17. Such nails being of limited length and quantity do not provide sufficient leakage through the concrete to defeat the insulating qualities of the epoxy.

The alternate strips of the metal plates will be alternately connected to the positive and negative poles of a source of electrical direct current, normally a voltage of 50 volts will be used although this is not critical. For example, the outer row of plates 16 may be connected to positive, while the second row 16A may be connected to negative, and the third row 16B again connected to positive and so on alternately for as many rows of plates as may be involved. The manner in which the current is picked up and transmitted to the vehicle will be shown in FIG. 5 and described hereinafter.

Adjacent the curved portions of the track, both inside and outside, there will be mounted rollers 20 at a height such that they will contact the bumper of the bumper cars. These rollers effectively alleviate and eliminate the tendency of vehicles to jam together when several of them come into contact with one another in a curved area. The rollers, thus, play an important part in keeping the continuous movement of the vehicles which is necessary for enjoyable and economical operation.

Each of the vehicles used in our improved entertainment ride is of essentially standard construction, known in the art, with the exception of a few details which will be pointed out. All standard vehicles of this type will have a body 52, a bumper of some type 56, a steering wheel 54, and normally two rear wheels 62 and 64 with a front wheel 60 having incorporated therein the motor 62 from which the motive power is derived, and which is economically used as the single steering wheel.

The more common electrical bumper ride vehicles will have a pole or the like extending upwardly with one contact and will have brush arrangements underneath for the other contact to provide the electrical power to the motor. In the case of our invention, however, we utilize a different system and certain features of our vehicle are hereinafter described, which contribute to the overall entertainment ride of this invention.

It will be noted that each of our vehicles will have four electrical contact arrangements 70, 72, 74 and 76. Experience has shown that at all times, or virtually all times, at least one of these pickup brushes, or shoes, as they are called in the trade 70, 72, 74, and 76 will be in contact with a negative and at least one in contact with a positive plate on the track.

Figure 5:
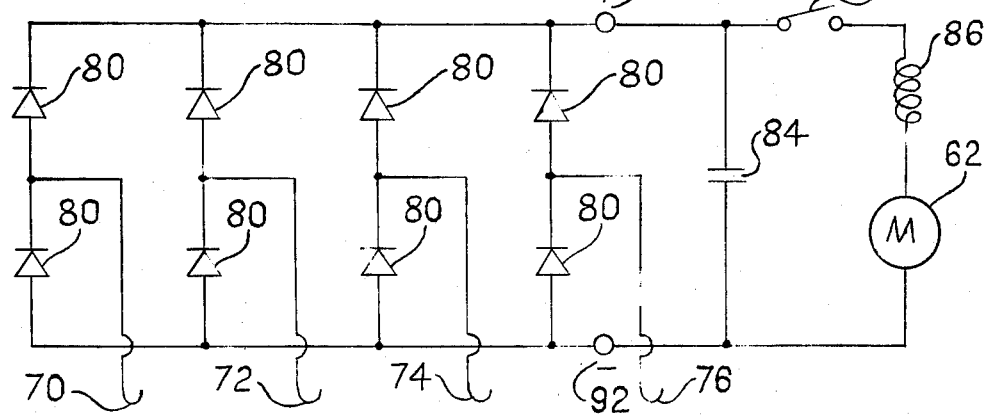
FIG. 5 is a schematic drawing of a preferred electrical circuit by which current is provided for the vehicle used in the entertainment ride of this invention.

In the case of our invention, the circuitry for the conduction of the electrical power is essentially as shown in FIG. 5. The four pickup brushes or shoes 70, 72, 74 and 76 are connected to four parallel circuits with appropriate diodes 80 to block the transmission of power in one direction at all times as indicated. Thus, if the pickup shoe 70, for example, is in contact with a negative plate, the diodes will prevent the current from flowing in the wrong direction to cause any shorting or difficulty. And thus if it is in contact with a positively charged plate the current will be caused to flow in the appropriate direction for contact to positive side. The positive side of the circuit 91 has been indicated merely to show that from the pickup this line will always be positive and the negative side 92 has been indicated for a like purpose.

The switch 82 is a switch located within the vehicle in the form of a foot pedal or the like as will be known to those skilled in the art. Those skilled in the electrical art will also recognize the utilization of the capacitor 84, the resistance 86 and the motor 62 within the diagram shown and will understand the purposes of the diodes illustrated as 80.

It is most desirable in a vehicle of this nature that the driving motor be connected with a single front wheel in the manner known to those skilled in this art. However, this is a cause of instability of the vehicle, particularly where relatively high speeds are involved and where the vehicle travels in a circular or oval configuration as is generally the case in this invention.

We have studied this problem and have evolved a very effective combination wherein two small wheels 77 are located outboard of the motor wheel 60. Each of these wheels is such that the frame of the bumper car will not touch the floor when it tilts or instability occurs. This is most important, since the frame can cause shorting of the electrical plates if it should pass across both a positive and negatively charged plate and can cause injuries as well as damage to the system. By the installation of these two wheels we have eliminated this problem which has plagued those who previously have attempted to utilize vehicles picking up power from beneath the vehicle only for both positive and negative. In no manner do the wheels we have installed interfere with the single steering and driving function of the front wheel since they are normally not in contact with the surface but are held slightly above the surface under the frame of the vehicle. When the occasion occurs, however, upon which the vehicle tilts, the wheel on the tilted side prevents the vehicle from coming into contact with its frame against the electricaly charged track.

Entertainment rides of the general nature of bumper cars and the like are dependent upon their economic success for rapid changing of drivers upon the expiration of a given time for a ride since down time of a vehicle is costly. At the same time, such rides are not economic nor popular when safety is not a prime consideration. One of the difficulties from a safety standpoint is the time and delay of the adjustment of seat belts or the like to keep the occupants within the vehicle. Various types of belts and shoulder harnesses have been devised fastened across the seat or across the shoulder to the seat and the like. None of these, however, is suitable to use without some detail of adjustment.

Figure 3:
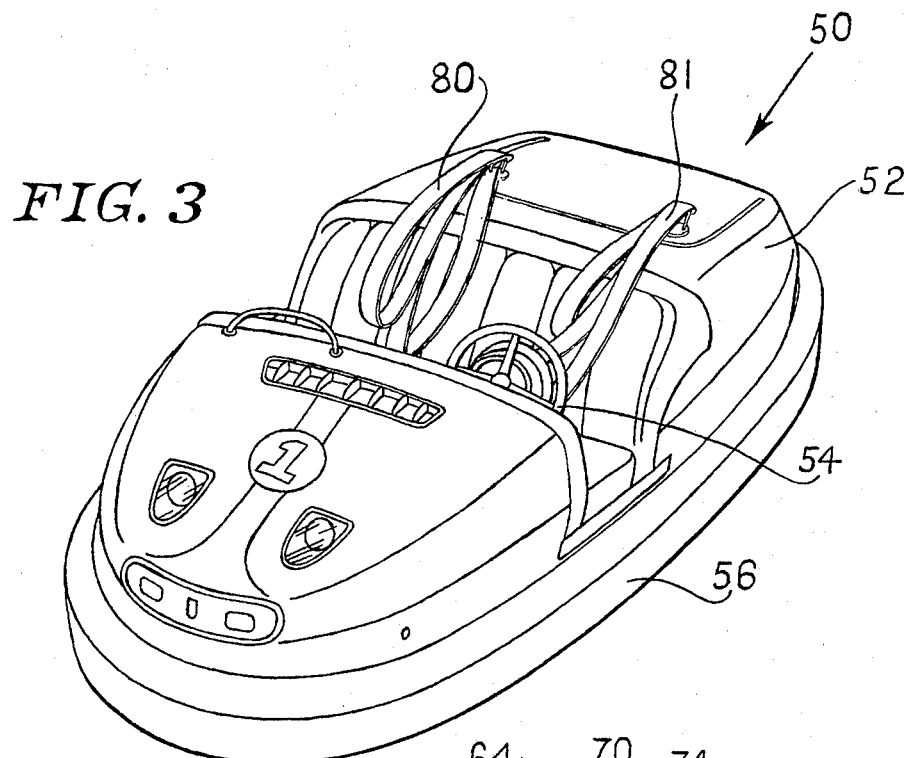
FIG. 3 is a perspective of a preferred vehicle to use in the entertainment ride of this invention.
Figure 4:
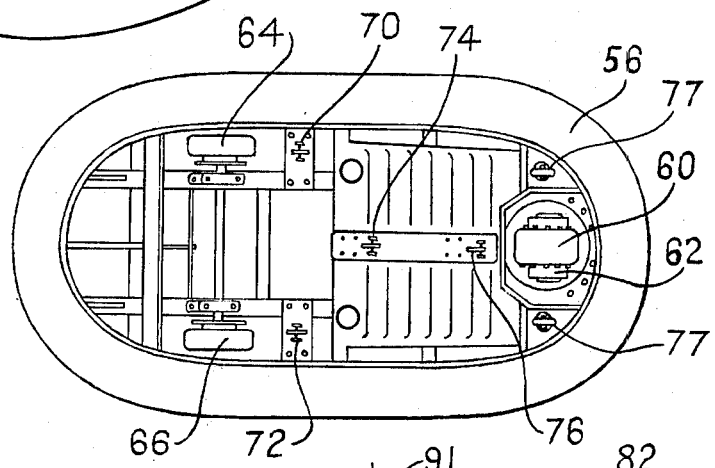
FIG. 4 is a bottom plan view of the vehicle of FIG. 3 in reduced scale.

We have finally developed a unique harness which accomplishes all of the safety features and yet requires no adjustment. Attention to FIG. 3 will show two looped straps 80 and 81 fastened to the back of the vehicle behind the passenger compartment. Fastening straps in this manner is previously unknown, but we have found that with one universal size strap fastened in this location it will quickly accommodate any driver who slips it over his or her chest as can be seen in the illustration of riders in vehicles on FIG. 1. By this unique location, as opposed to a seat belt type location or the like, a strap will prevent a driver or passenger from being thrown from the vehicle, yet does not require individual adjustment.

Until our discovery of a means for mounting the electrically conductive track effectively upon a concrete surface, it has always been a practice for any track of this nature to be located upon a wooden, or other such surface. Such structure has been essentially impossible of satisfactory operation in a configuration of an oval banked track as indicated in FIGS. 1 and 2, in that metal plates shift and cause electrical problems as well as ultimate complete destruction of the wooden surface. Also, the resilience of the wood has been considered necessary.

By a combination of the adhesive power of the epoxy in which we have located the plates, and the use of the few concrete nails through the plates, we have been able to solve this problem. Since the concrete nails do not provide conductivity such as to cause effective leakage to defeat the system we are able to use them in this manner in combination with the adhesive, insulating, and shock absorbing apoxy binder between the concrete and the electrical plates.

The overall results of our improvements in the combination of an electrical amusement vehicle of this nature is the achievement of an entertainment ride combing the features of a bumper car and a raceway type ride the safety and practicality which has never been possible before.

While the embodiment of this invention shown and described is fully capable of achieving the objects and advantages desired it will be clear, and should be understood, that this embodiment has been for purposes of illustration only and is not for purposes of limitation.

We claim:

1. A closed loop track for amusement type electrically powered vehicles, comprising: A concrete support base extending under the entire surface area of the track, the upper surface thereof being in the desired configuration of a track surface; a thick plastic insulating coating deposited on and entirely covering the upper surface of the concrete support base; a plurality of spaced substantially parallel electrical conductor strips embedded in the insulating coating and presenting an exposed upper surface for electrical engagement, the insulating coating electrically isolating the strips from each other; the conductor strips each being electrically connected to a power supply.

2. A closed loop track for amusement type electrically powered vehicles as set forth in claim 1, wherein: The plastic insulating material is an epoxy resin type of material.

3. The closed loop track for amusement type electrically powered vehicles as set forth in claim 1 wherein: The parallel electrical conductor strips are mechanically fastened to both the plastic insulating coating and the upper portion of the concrete support base.

4. The closed loop track for amusement type electrically powered vehicles as set forth in claim 1 wherein: The concrete support base provides a banked and elevated track at its upper surface.

5. The combination of claim 4 in which at least one closed loop shoulder belt is fastened to the vehicle to the rear of and elevated above the seat of the vehicle.

6. The combination with electrically operated amusement vehicles having means beneath such vehicles to receive electrical energy of a track for said vehicles to travel upon comprising: A series of metal plates, some of which are insulated from each other; each of which is mounted upon an insulated material fastened to a concrete base; and in which some of said plates are electrically charged negatively and some are electrically charged positively and those which are electrically charged negatively are insulated from those which are electrically charged positively, and wherein each vehicle has one small wheel located upon each side thereof, each of which said small wheels is normally at an elevated distance above the surface upon which the vehicle travels, and each of which will come in contact with the surface upon which the vehicle travels upon tilting of the vehicle directionally in the direction which each of said wheels is located from the driving wheel.

7. The combination with electrically operated amusement vehicles having means beneath such vehicles to receive electrical energy of a track for said vehicles to travel upon comprising: A series of metal plates, some of which are insulated from each other; each of which is mounted upon an insulated material fastened to a concrete base; and in which some of said plates are electrically charged negatively and some are electrically charged positively and those which are electrically charged negatively are insulated from those which are electrically charged positively, and wherein rollers are mounted above the surface of said track adjacent each area of curvature thereof.

* * * * *